United States Patent Office 3,019,187
Patented Jan. 30, 1962

3,019,187
LUBRICATING COMPOSITIONS
Jerome Panzer, Rahway, N.J., and Roy A. Westlund, Jr., Oxford, England, assignors to Esso Research and Engineering Company, a corporation of Delaware
No Drawing. Filed Dec. 6, 1957, Ser. No. 700,961
6 Claims. (Cl. 252—33.3)

This invention relates to lubricating oil compositions. Particularly, it relates to lubricating fluids and greases comprising mineral lubricating oil, mixed metal salts of a low molecular weight carboxylic acid and a sulfonic acid, and certain stabilizing agents.

It had been known in the art that mixed metal salts of sulfonic acid and low molecular weight carboxylic acid could be used in lubricant manufacture. Reissue Patent 23,082 to Zimmer et al., discloses a grease composition made by thickening a mineral lubricating oil with a so-called Werner complex formed at relatively low temperatures from a petroleum sulfonate and a salt of a low molecular weight carboxylic acid, e.g. acetic acid. However, in order to achieve good load-carrying ability, it has since been found desirable to use a high molar ratio of carboxylate to sulfonate in preparing such lubricants. But fluid lubricants prepared in this manner are unstable and the salt thickener settles out upon storage. It has now been found that by using certain stabilizing agents or dispersing agents, that structurally stable lubricating fluids and semi-fluids may be prepared from the mixed-salt material using these high molar ratios of carboxylate to sulfonate. It has been further found that when the mixture of the salts and stabilizing agent is heated to temperatures of about 380 to 500° F. that a new type of complex material is formed which radically differs from the type of complex obtained by Zimmer et al. upon dehydration at lower temperatures. Thus, X-ray diffraction studies show that the crystal structure of the low molecular weight carboxylic acid salt, which is present when the grease is prepared at lower temperatures, substantially disappears when the lubricant is prepared at temperatures of above 380° F. This new type of complex (i.e. prepared above 380° F.) has much greater load-carrying ability than the corresponding material prepared at lower temperatures. Also, when sufficient thickener is used to form greases, the high temperature complex results in greases having better structural stability and a greater degree of thixotropy than the so-called complexes formed at lower temperatures.

Suitable low molecular weight acids used in forming the carboxylate component of the thickener include $C_2$ to $C_4$ fatty acids, e.g. acetic and propionic acids. Salts may also be prepared from the corresponding acid anhydrides. Acetic acid or its anhydride is particularly preferred.

The metal sulfonate component of the mixed-salt thickener can be prepared from high molecular weight sulfonic acids formed by treating petroleum oils of the lubricating oil range with concentrated sulfuric acid or oleum. These acids generally have molecular weights of about 200 to 700, e.g. 400 to 600. The sulfonates can also be derived from relatively pure sulfonic acids having from about 10 to 33 carbon atoms per molecule. For example, sulfonated products of alkylated aromatics such as benzene, toluene and xylene, alkylated with olefins or olefin polymers of the type of polypropylene and polyisobutylene can be used. Also included are the sulfonates having a high alkalinity which are prepared by reacting an excess of metal base with the sulfonic acid. Such high alkalinity sulfonates are well known in the art and have been described in numerous patents.

The metal component of the mixed-salt material is preferably an alkaline earth metal: i.e., calcium, barium, magnesium or strontium.

A wide variety of materials were investigated as stabilizers for the mixed-salt containing lubricants of the invention. However, only the following types of materials were found to be effective.

A. Mono and dialkylolamides of $C_9$ to $C_{21}$ fatty acids. These materials have the general formula:

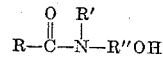

wherein R is a $C_8$ to $C_{20}$ alkyl group of a saturated fatty acid, R' is hydrogen or —R″OH, and R″ is a $C_2$ to $C_9$, e.g. $C_2$ to $C_3$, aliphatic saturated hydrocarbon radical. The hydroxyl group will generally be attached to the terminal carbon atom, although it may be attached to other carbon atoms of the R″ hydrocarbon group. Specific examples of such materials include N, N-di (2-hydroxy ethyl) lauramide; N-2-hydroxy ethyl lauramide; N-6-hydroxy hexyl stearamide and N, N-di (3-hydroxy propyl) lauramide. A commercial material consisting of about 65 wt. percent of N, N-di (2-hydroxy ethyl) lauramide as the active ingredient and available under the trade-name Nopcogen 12-L, was used in several of the examples of the invention.

B. Alkylphenoxy polyoxyethylene alcohols and ethers of the general formula:

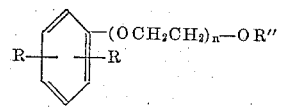

wherein R, R' and R″ are hydrogen or $C_1$ to $C_{12}$ alkyl groups and $n$ is about 5 to 30. A specific example of such a material is:

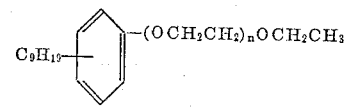

wherein $n$ averages 30, which is sold under the tradename Igepal CO–880. The length of the polyoxyethylene group is apparently important in determining the effectiveness of the above types of materials as stabilizing agents. Thus, a material of the above type wherein $n$ was 4, was not effective.

C. Fatty acid condensates of polyamines. These materials have the general formula:

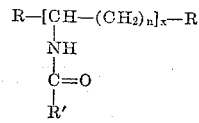

wherein R is a $C_1$ to $C_6$ alkyl radical, R' is a $C_1$ to $C_{20}$ alkyl radical of a fatty acid, $n$ is 0 to 6 and $x$ is 2 to 10. In general, these materials are formed by condensing fatty acids such as acetic, valeric, caproic, capric, lauric, and stearic acids with polyamines such as poly-α-methylamine, poly-α-butylamine and poly-α-hexylamine. Materials of this type and their formation are well known in the art.

Suitable oil bases for the lubricants of the invention include naphthenic mineral lubricating oils having a viscosity at 210° F. of about 30 to 300 SUS., preferably 30 to 110 SUS. and viscosity indexes of about —100 to +70. These oils consist primarily of saturated cyclic organic compounds and are prepared by acid-treating, clay-treating, hydrofining and other methods well known in the art. Paraffinic oils, i.e. oils containing principally aliphatic hydrocarbons will not form stable dispersions when used in the practice of this invention.

The compositions of the invention will comprise a naphthenic lubricating oil, about 0.5 to 50 weight percent of the mixed-salt and about 0.01 to 5.0 weight percent of the stabilizing agent. Generally, about 0.02 to 0.1 parts by weight of stabilizing agent will be used per part by weight of the mixed-salt. The mixed-salt, in turn, will comprise about 6 to 50, e.g. 10 to 40, moles of alkaline earth metal salt of a low molecular weight carboxylic acid per mole of metal sulfonate. To form fluid and semi-fluid lubricants, about 0.5 to 15.0 wt. percent of the mixed-salt will be used, while about 15 to 50% will be used when a grease is desired.

Various other additives or thickening agents may also be incorporated into the lubricating composition in amounts of 0.001 to 15 weight percent. For example, oxidation inhibitors such as phenyl alpha-naphthylamine; viscosity index improvers such as polyisobutylene; corrosion inhibitors, such as sorbitan monooleate; pour depressants; dyes; other grease thickeners and the like may be used.

In general, the lubricating compositions of the invention can be prepared by dispersing the sulfonate and an aqueous solution or dispersion of the carboxylate along with the stabilizing agent into a lubricating oil. The mixture may be heated to temperatures of about 250 to 350° F. to dehydrate the mixture. However, a preferred method is to form the carboxylate in situ in the lubricating oil by neutralization of the carboxylic acid with a metal base. The sulfonate and stabilizing agent may be present during this neutralization. The mixture is then heated to temperatures of at least about 250 to 350° F. in order to dehydrate the material. If it is desired to form the mixed-salt complex of the invention, then heating at higher temperatures of about 380 to 500° F. is necessary. After cooling the composition to about 200 to 300° F. conventional additives, if any, may be added and the material is then preferably homogenized at high rates of shear before cooling to room temperatures. This homogenization may be carried out by using a Manton-Gaulin homogenizer, a Morehouse mill, a Charlotte mill or other homogenizing equipment known in the art.

The invention will be further understood by the following examples which include preferred embodiments of the invention:

EXAMPLE I

To demonstrate the effectiveness of the stabilizing agents of the invention the following fluid dispersions were prepared:

A. 30 parts by weight of an aqueous solution containing 10 weight percent of calcium acetate was added to 95.5 parts by weight of a mineral lubricating oil having a viscosity of 45 SUS. at 210° F., which was a solvent extracted naphthenic pale oil, along with 1.5 parts by weight of barium sulfonate concentrate. This concentrate consisted of 45 wt. percent solution of barium synthetic sulfonate in a naphthenic mineral oil. The sulfonate was prepared by reacting excess barium hydroxide with an alkylated sulfonic acid to give an alkaline product. This sulfonate had an average molecular weight of about 1,000 and a total base number of about 45 as determined by ASTM D644–547. The above mixture was then heated to about 300 to 320° F. until dehydrated, care being taken not to allow the temperature to exceed 350° F. The mixture was then cooled to about 70° F. and was then passed through a Gaulin homogenizer operating at about 6,000 p.s.i. shear.

B. Example I–A was repeated except that 95.0 parts of oil were used and 0.5 parts by weight of Nopcogen 12–L was added to the mixture before heating to dehydrate. The resulting fluid was a non-thixotropic material which gave a wear scar of .38 mm. in the 4–ball wear test.

C. to H. Example I–B was repeated except that various other stabilizing agents were used in place of the Nopcogen 12–L.

The compositions of Examples I–A to I–H were allowed to stand at room temperature and were examined at the end of 24 hours and 10 days to determine whether any of the mixed-salt material had precipitated from the composition. Results of this stability test are summarized in Table I, which follows:

Table I

| Dispersing additive | Stability | |
|---|---|---|
| | 24 hours | 10 days |
| A. None | Separated | |
| B. Nopcogen 12–L (about 65 weight percent lauric diethanolamide as active ingredient) | Stable | Stable |
| C. Nopcogen 16–0 (oleic polyamine condensate) | do | Do. |
| D. Igepal CO–210 $(n-C_9H_{19}.C_6H_4O-(C_2H_4O)_{1.5}H)$ | Separated | |
| E. Igepal CO–430 $(n-C_9H_{19}.C_6H_4O-(C_2H_4O)_4H)$ | do | |
| F. Igepal CO–880 $(n-C_9H_{19}.C_6H_4O-(C_2H_4O)_{30}H)$ | Stable | Stable. |
| G. Igepal CA–630 $(iso-C_8H_{17}.C_6H_4O-(C_2H_4O)_{9.5}H)$ | do | Do. |
| H. Igepal DM–710 $(di-(n-C_8H_{17}).C_6H_3O-(C_2H_4O)_{5.5}H)$ | do | Do. |

As seen from the above table, the fluid calcium acetate-barium sulfonate without any dispersing agent (A) was unstable and separation of the salts from the fluid resulted in 24 hours. The use of lauric diethanolamide (B) formed a stable composition as did the oleic polyamine condensate (C). The alkyl phenoxy polyoxyethylene ethanols having a short ethylene oxide polymeric chain were ineffective (see D and E), although the longer chain ethylene oxide materials (F, G and H) were effective.

The effect of heating the mixed-salt materials to high temperatures was investigated and the following experiments were made:

EXAMPLE II

A. A lubricant was prepared as follows: 65.0 wt. percent of a naphthenic mineral lubricating oil having a viscosity of 78 SUS. at 210° F. was blended with 8.65 wt. percent of a barium sulfonate concentrate (same as used in Example I), 15.35 wt. percent of acetic acid, 10.0 wt. percent of hydrated lime and 1.0 wt. percent of Nopcogen 12–L. This mixture was heated to 300° F. in order to dehydrate the mixture, then cooled to 250° F. where 1 wt. percent of phenyl alpha-naphthylamine was added, before cooling to room temperature. The material was then worked on a flat plate with a spatula to form a smooth mixture.

B. Example II–A was repeated, except that the reaction mixture was heated to 450° F. in order to form the complex thickeners of the invention.

C. A grease was prepared in the manner of Example II–B above except for different proportions of ingredients, the maximum manufacturing temperature was 430° F. and a calcium sulfonate concentrate was used. The sulfonate concentrate consisted of 30 wt. percent of calcium sulfonate and 70 wt. percent oil. This calcium sulfonate was prepared by neutralizing an alkylated benzene (same as used in preparing the barium sulfonate previously discussed) with an excessive amount of base so as to achieve a total base number of about 45 (ASTM D644–547).

D. and E. In these examples, the grease was prepared in the general manner of Example II–B, except for changes in proportions of ingredients.

The compositions of Examples II–A to II–E are summarized in the following table along with their major physical properties:

Table II

| Composition (weight percent) | Example II | | | | |
|---|---|---|---|---|---|
| | A | B | C | D | E |
| Acetic acid (glacial) | 15.35 | 15.35 | 15.35 | 12.0 | 6.8 |
| Hydrated lime | 10.00 | 10.0 | 10.0 | 7.8 | 4.5 |
| Barium sulfonate (45 weight percent concentrate) | 8.65 | 8.65 | | 8.6 | 4.7 |
| Calcium sulfonate (30 weight percent concentrate) | | | 8.65 | | |
| Nopcogen 12-L [1] | 1.0 | 1.0 | 1.0 | 1.0 | 1.0 |
| Phenyl α-naphthylamine | 1.0 | 1.0 | 1.0 | 1.0 | 1.0 |
| Mineral lubricating oil (78 SUS. at 210° F.) | 64.0 | 64.0 | 64.0 | 69.6 | 82.0 |
| Manufacturing temperature (° F. max.) | 300 | 450 | 430 | 450 | 450 |
| Properties: | | | | | |
| Appearance | [2] | [3] | [3] | [3] | [3] |
| 4-ball wear test (1,800 r.p.m., 75° C. 1 hour, 10 kg.) scar diam. mm | 0.44 | 0.36 | 0.40 | 0.32 | 0.28 |
| Approximate time (minutes) to recover from fluid to solid grease | [4] | 5–10 | 15 | 3 | 5–10 |
| Timken OK load, lbs | | 40 | | 35 | 30 |

[1] Commercial material consisting of about 65 wt. % N,N-di(2-hydroxy ethyl) lauramide.
[2] Semifluid.
[3] Excellent uniform greases.
[4] Non-thixotropic semi-fluid. Material had an unworked micropenetration of 52 mm./10, and after being worked 20 strokes ha da micropenetration of 260 mm./10 thus showing poor stability.

As seen from the preceding table, uniform greases having a high degree of thixotropy, low wear characteristics and high load-carrying ability may be formed by the method of the invention (B. to E.). On the other hand, softer and less structurally stable, non-thixotropic greases are formed at lower manufacturing temperatures (see A.). Attempts to form a complex containing grease at temperatures above 400° F. without the presence of the dispersing agent, were unsuccessful as the salts settled out of the oil when upon heating to a temperature of about 300° F.

Several more fluid type lubricants were prepared at high temperatures using naphthenic base oils. These compositions are described in Example III.

EXAMPLE III

A. to C. These fluid lubricants were prepared in a manner similar to that followed in preparing the compositions of Example II—A, except that smaller proportions of the mixed salts and dispersing agent were used and the final material was homogenized by passing through a Morehouse mill.

D. and E. These fluid lubricants were prepared from aqueous solutions of calcium acetate in the general manner of Example I—A.

The composition and wear characteristics of Examples III—A to III—E are summarized in Table III which follows:

Table III

| Composition, weight percent | Example III | | | | |
|---|---|---|---|---|---|
| | A | B | C | D | E |
| Calcium acetate | | | | 3.0 | 4.5 |
| Barium sulfonate [1] (45 weight percent concentrate) | 3.0 | | 1.7 | 1.5 | 2.5 |
| Calcium sulfonate [1] (30 weight percent concentrate) | | 2.2 | | | |
| Acetic acid (glacial) | 4.3 | 3.85 | 3.1 | | |
| Hydrated lime | 2.9 | 2.5 | 2.0 | | |
| Nopcogen 12-L [2] | .2 | .25 | .2 | .5 | .5 |
| Mineral lubricating oil (45 SUS. at 210° F.) | 11.6 | | 80.2 | 95.0 | |
| Mineral lubricating oil (37 SUS. at 210° F.) | 78.0 | | | | 50.0 |
| Mineral lubricating oil (78 SUS. at 210° F.) | | 91.2 | 12.8 | | 42.5 |
| Manufacturing temperature (° F. max.) | 375 | 430 | 450 | 325 | 450 |
| 4-ball test (1,800 r.p.m., 1 hour, 75° C., 10 kg.) wear scar dia. mm | 0.51 | 0.53 | 0.45 | 0.41 | 0.44 |

[1] Same as used in Example II.
[2] Contains about 65 weight percent lauric diethanolamide as active ingredient.

The five compositions of Example III were all stable, showing no salt precipitation upon storage. Furthermore, these compositions had good load-carrying ability as shown by the results of the 4-ball test.

To further illustrate the invention, other compositions can be prepared as follows:

A. Example I—B can be repeated but using 0.5 parts by weight of 100% lauric diethanolamide instead of the 0.5 wt. percent of Nopcogen 12-L, which contained about 65 wt. percent lauric diethanolamide as the active ingredient.

B. Example I—B can be repeated but using 1.0 parts by weight of a material having the formula:

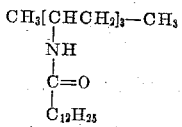

in place of the 0.5 parts by weight of Nopcogen 12-L.

It has also been found that carboxylate-sulfonate lubricating systems may also be stabilized with synthetic diester lubricating oils. Thus, stable lubricants may be prepared in the manner previously described, but substituting a portion or all of the mineral oil base with a synthetic diester oil. In this manner, the use of other stabilizing materials can be avoided. The diester oils which may be used for this purpose are those prepared by reacting $C_6$ to $C_{15}$ alkanols with $C_6$ to $C_{12}$ alkanedioic acids, e.g. di(2-ethylhexyl)adipate. Specifically, a lubricating grease of this type was prepared by mixing 49.0 wt. percent diisooctyl azelate, 18.7 wt. percent glacial acetic acid, 12.3 wt. percent hydrated lime, and 20.0 wt. percent of a high alkalinity calcium sulfonate. This mixture was heated to dehydrate, then further heated at 470° F. for seven hours and finally cooled. The resulting grease had a dropping point of 500+, an unworked penetration at 77° F. of 307 mm./10 and after five days storage had slightly hardened to a penetration of 278 mm./10, or a 9.7% decrease. Such synthetic ester lubricants are particularly useful for aircraft lubrication, but for more general lubrication the naphthenic mineral oil lubricants previously discussed are preferred.

What is claimed is:

1. A lubricating composition selected from the group consisting of solid lubricating compositions, semi-fluid lubricating compositions and fluid lubricating composition comprising about 0.5 to 50.0 wt. percent of a mixed-salt dispersed in a major proportion of naphthenic mineral lubricating oil and stabilized with about 0.01 to 5.0 wt. percent of a stabilizing agent, wherein said solid lubricant has been prepared by heating said mixed-salt at a temperature sufficient to form a complex and within the range of 300° to 500° F. and wherein said stabilizer is in the presence of said mixed-salt when the temperature has reached 300° F. in said heating, wherein said mixed-salt comprises in a molar proportion about 6 to 50 moles of an alkaline earth metal salt of a $C_2$ to $C_4$ fatty acid per mole of an alkaline earth metal salt of a sulfonic acid of about 200 to 700 molecular weight, and wherein said stabilizing agent is selected from the group of stabilizing agents consisting of: mono- and dialkylolamides of a $C_9$ to $C_{21}$ saturated fatty acid wherein said alkyl groups contain 2 to 9 carbon atoms; alkylphenoxy polyoxyethylene and alkyl ethers thereof wherein said alkyl groups contain 1 to 12 carbon atoms and the number of oxyethylene groups in said polyoxyethylene chain is 5 to 30; and fatty acid condensates of polyamines of the general formula:

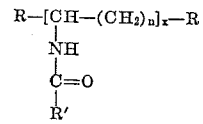

wherein R is a $C_1$ to $C_6$ akyl radical, R' is a $C_1$ to $C_{20}$ alkyl radical, $n$ is 0 to 6 and $x$ is 2 to 10.

2. A solid lubricating composition according to claim 1, which is a lubricating grease and contains about 15 to 50.0 wt. percent of said mixed-salt.

3. A lubricant according to claim 1, wherein said stabilizing agent is selected from the group consisting of mono- and dialkylolamides of the general formula:

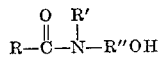

wherein R is a $C_8$ to $C_{20}$ alkyl group, R' is selected from the group consisting of hydrogen and —R"OH radicals, and R" is a $C_2$ to $C_9$ aliphatic saturated hydrocarbon radical.

4. A lubricant according to claim 1, wherein said stabilizing agent is selected from the group consisting of alkylphenoxy polyoxyethylene alcohols and ethers thereof of the formula:

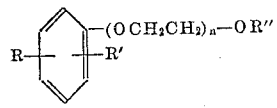

wherein R, R' and R" are each selected from the group consisting of hydrogen and $C_1$ to $C_{12}$ alkyl groups and $n$ is about 5 to 30.

5. A lubricant according to claim 1, wherein said stabilizing agent is selected from the group consisting of polyamines of the general formula:

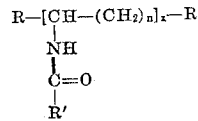

wherein R is a $C_1$ to $C_6$ alkyl radical, R' is a $C_1$ to $C_{20}$ alkyl radical, $n$ is 0 to 6 and $x$ is 2 to 10.

6. A fluid lubricating composition comprising about 0.5 to 15.0 wt. percent of a mixed-salt dispersed in a major proportion of naphthenic mineral lubricating oil and stabilized with about 0.01 to 5.0 wt. percent of a stabilizing agent, wherein said mixed-salt comprises in a molar proportion about 6 to 50 moles of an alkaline earth metal salt of a $C_2$ to $C_4$ fatty acid per mole of an alkaline earth metal salt of a sulfonic acid of about 200 to 700 molecular weight, and wherein said stabilizing agent is selected from the group of stabilizing agents consisting of: mono and dialkylolamides of a $C_9$ to $C_{21}$ saturated fatty acid wherein said alkyl groups contain 2 to 9 carbon atoms; alkylphenoxy polyoxyethylene and alkyl ethers thereof wherein said alkyl groups contain 1 to 12 carbon atoms and the number of oxyethylene groups in said polyoxyethylene chain is 5 to 30; and fatty acid condenstates of polyamines of the general formula:

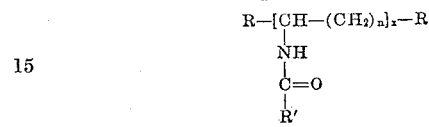

wherein R is a $C_1$ to $C_6$ alkyl radical, R' is a $C_1$ to $C_{20}$ alkyl radical, $n$ is 0 to 6 and $x$ is 2 to 10.

References Cited in the file of this patent

UNITED STATES PATENTS

| | | |
|---|---|---|
| Re. 23,082 | Zimmer et al. | Jan. 25, 1949 |
| 1,937,463 | Nill | Nov. 28, 1933 |
| 2,403,067 | Fisher et al. | July 2, 1946 |
| 2,467,176 | Zimmer et al. | Apr. 12, 1949 |
| 2,475,589 | Bondi | July 12, 1949 |
| 2,487,080 | Swenson | Nov. 8, 1949 |
| 2,540,534 | Kolfenback et al. | Feb. 6, 1951 |
| 2,553,422 | O'Halloran | May 15, 1951 |
| 2,553,423 | Shepard | May 15, 1951 |
| 2,562,814 | O'Halloran | July 31, 1951 |
| 2,588,556 | Moore et al. | Mar. 11, 1952 |
| 2,622,067 | White et al. | Dec. 16, 1952 |
| 2,735,815 | Morway | Feb. 21, 1956 |

OTHER REFERENCES

The Condensed Chemical Dictionary, 1956, Reinhold Publ. Corp., pages 583, 584 and 788.

"The Institute Spokesman" March, 1951, National Lubricating Grease Institute, pages 7, 9, 11–13, 15–17, 19 and 21.